(12) United States Patent
Gao et al.

(10) Patent No.: US 12,494,673 B2
(45) Date of Patent: Dec. 9, 2025

(54) WIRELESS CHARGING TRANSMITTER AND METHOD FOR CONTROLLING THE WIRELESS CHARGING TRANSMITTER

(71) Applicant: NXP USA, Inc., Austin, TX (US)

(72) Inventors: Xiang Gao, Shanghai (CN); Chongli Wu, Queen Creek, AZ (US); Dengyu Jiang, Suzhou (CN); Li Wang, Suzhou (CN)

(73) Assignee: NXP USA, Inc., Austin, TX (US)

( * ) Notice: Subject to any disclaimer, the term of this patent is extended or adjusted under 35 U.S.C. 154(b) by 814 days.

(21) Appl. No.: 17/808,383

(22) Filed: Jun. 23, 2022

(65) Prior Publication Data

US 2023/0006473 A1    Jan. 5, 2023

(30) Foreign Application Priority Data

Jun. 30, 2021  (CN) .......................... 202110738543.3

(51) Int. Cl.
| | |
|---|---|
| H01M 10/44 | (2006.01) |
| H01M 10/46 | (2006.01) |
| H02J 7/00 | (2006.01) |
| H02J 50/10 | (2016.01) |
| H02J 50/40 | (2016.01) |
| H02J 50/80 | (2016.01) |

(52) U.S. Cl.
CPC ............ *H02J 50/10* (2016.02); *H02J 7/0047* (2013.01); *H02J 50/40* (2016.02); *H02J 50/80* (2016.02); *H02J 2207/20* (2020.01)

(58) Field of Classification Search
CPC .. H02J 7/0047; H02J 7/02; H02J 50/10; H02J 50/005; H02J 50/40; H02J 50/80; H02J 50/12; H02M 7/5387

USPC ................ 320/104, 107, 108, 140, 142, 143
See application file for complete search history.

(56) References Cited

U.S. PATENT DOCUMENTS

| | | | |
|---|---|---|---|
| 9,030,051 B2 | 5/2015 | Muratov | |
| 9,843,219 B2 | 12/2017 | Ye et al. | |
| 2015/0012759 A1 | 1/2015 | Mozak et al. | |

FOREIGN PATENT DOCUMENTS

| | | | | |
|---|---|---|---|---|
| CN | 105452974 A | * | 3/2016 | ............ H02M 3/335 |
| CN | 107104516 B | * | 5/2020 | |

OTHER PUBLICATIONS

"E-06 Ripple Voltage," Table 21: Test parameters for E-06 Ripple voltage, VW 80000: Oct. 2017, pp. 39-40.

* cited by examiner

*Primary Examiner* — Edward Tso

(57) ABSTRACT

A wireless charging transmitter includes first and second input terminals for receiving an input voltage from a power source, a coil, an inverter having first and second inverter input terminals coupled to the first and second input terminals respectively, and first and second inverter output terminals for providing an output voltage to the coil. A control system is configured to monitor a voltage between the first and second input terminals, and control the inverter to adjust the output voltage, based on an offset between the monitored voltage and a target voltage, to at least partially compensate the offset. The wireless charging transmitter may further include an ideal diode coupled between one of the input terminals and the inverter.

20 Claims, 5 Drawing Sheets

WIRELESS CHARGING TRANSMITTER AND METHOD FOR CONTROLLING THE WIRELESS CHARGING TRANSMITTER

CROSS-REFERENCE TO RELATED APPLICATIONS

This application claims the priority under 35 U.S.C. § 119 of China application no. 202110738543.3, filed on 30 Jun. 2021, the contents of which are incorporated by reference herein.

FIELD OF THE DISCLOSURE

The present disclosure relates to a wireless charging transmitter and a method for controlling the wireless charging transmitter. In particular, but not exclusively, it relates to a wireless charging transmitter comprising a control system for adjusting a current or voltage supplied to a power transmitter coil to at least partially compensate for fluctuations in a power source voltage.

BACKGROUND OF THE DISCLOSURE

In automotive applications, a wireless charging transmitter is one type of device connected to the battery and is used to wirelessly transmit power from the wireless charging transmitter to a power receiving device. Other devices may also be connected to the battery. Wireless charging uses in-band ASK communication to send data from a power receiving device to the wireless charging transmitter. This data is a feedback signal for regulating the power delivery. The ASK method involves the power receiving device toggling its load to cause the current/voltage amplitude in the power transmitter coil to change, with the duration of the change representing the logic 1 or 0. ASK demodulation at the wireless charging transmitter is used to obtain the data from the detected change in the current/voltage amplitude at the power transmitter coil.

SUMMARY OF THE DISCLOSURE

Aspects of the disclosure are set out in the accompanying claims. Combinations of features from the dependent claims may be combined with features of the independent claims as appropriate and not merely as explicitly set out in the claims.

According to an aspect of the disclosure, there is provided a wireless charging transmitter comprising:
first and second input terminals for receiving an input voltage from a power source;
a coil;
an inverter having first and second inverter input terminals coupled to the first and second input terminals respectively, and first and second inverter output terminals for providing an output voltage to the coil; and
a control system configured to:
monitor a voltage between the first and second input terminals, and
control the inverter to adjust the inverter output voltage based on an offset between the monitored voltage and a target voltage, to at least partially compensate the offset between the monitored voltage and a target voltage.

By including a control system configured to monitor a voltage between the first and second input terminals, and control the inverter to adjust the inverter output voltage based on an offset between the monitored voltage and a target voltage, to at least partially compensate the offset between the monitored voltage and a target voltage, an energy disturbance on the coil caused by a voltage ripple on the power source may be reduced or suppressed, improving stability of the charging process. A voltage ripple on the power source may be due to another device, such as another wireless charging transmitter or a DC/DC converter, being connected to the same power source.

The target voltage may be an average value of the monitored voltage.

The control system may be configured to determine the average value of the monitored voltage.

The average value of the monitored voltage may be obtained using a moving filter.

The moving filter may be implemented by a software algorithm or by hardware. For example, the moving filter may be implemented by external RC circuits.

The control system may be configured to control the inverter by adjusting one of a duty cycle, phase shift or frequency of the inverter.

The control system may be configured to control the inverter by adjusting one of a duty cycle, phase shift or frequency of the inverter by an amount that is determined by the offset between the monitored voltage and the target voltage.

The control system may be configured to control the inverter by adjusting one of a duty cycle, phase shift or frequency of the inverter by a relative amount that is proportional to a relative offset between the monitored voltage and the target voltage.

For example, the control system may control the inverter to cause a relative change in the duty cycle that is proportional to the relative offset between the monitored voltage and the target voltage. The constant of proportionality may be negative.

The control system may be configured to determine a frequency of a ripple on the monitored voltage, and to monitor the voltage between the first and second input terminals at a sampling frequency greater than the frequency of the ripple.

By monitoring the voltage between the first and second input terminals at a sampling frequency greater than the frequency of the ripple, compensation of the ripple may be improved.

The control system may be further configured to:
monitor a current in the coil, and
control the inverter to adjust the output voltage to reduce an offset between the monitored current and a target current.

This may further reduce or suppress an energy disturbance on the coil caused by a voltage ripple from another device sharing a common power source (e.g. another wireless charging transmitter, a DC/DC converter, or a switched-mode power supply), improving the stability of the charging process.

The target current may be at least partially determined by a power control signal received from a device wirelessly receiving power from the wireless charging transmitter.

The target current may be adjusted based on the offset between the monitored voltage and the target voltage to at least partially compensate the offset between the monitored voltage and the target voltage.

In this way, adjustments to the target current based on the offset between the monitored voltage and the target voltage may be used to indirectly compensate the offset between the monitored voltage and the target voltage.

The control system may comprise a proportional-integral (PI) controller configured to output a signal for controlling the inverter based on the offset between the monitored current and the target current.

The coil current may effectively be monitored by monitoring the coil voltage, since they have similar waveforms.

The wireless charging transmitter may be configured to receive a power control signal from a device wirelessly receiving power from the wireless charging transmitter, wherein the control system is configured to control the inverter to adjust the inverter output voltage to at least partially compensate the offset between the monitored voltage and the target voltage and/or to reduce the offset between the monitored current and the target current after receiving each said power control signal.

The power control signal may be received as a modulation of the coil current or voltage. The power control signal may be an Amplitude-Shifted-Key (ASK) signal. The power control signal may be a Control Error Packet (CEP).

The control system may be configured to temporarily stop controlling the inverter to adjust the inverter output voltage to reduce the offset between the monitored current and the target current during a period of time when a power control signal may be received.

This avoids the control system controlling the inverter in response to changes in the coil current/voltage due to an ASK modulation.

The wireless charging transmitter may further comprise:
a diode device coupled between one of the first and second input terminals and a corresponding one of the first and second inverter input terminals.

This may reduce or prevent an ASK signal received at the wireless charging transmitter from causing a disturbance at another device sharing a common power source with the wireless charging transmitter, by blocking the perturbation due to the ASK signal from reaching the voltage bus of the DC power source. As an example, this may reduce or prevent the wireless charging transmitter generating a ripple on the power source voltage which could interfere with ASK demodulation at another wireless charging transmitter sharing a common power source, thereby improving stability of a charging process at the other wireless charging transmitter.

The diode device may be arranged to preferentially allow current to flow from the first input terminal to the first inverter input terminal, while blocking current from flowing in the reverse direction.

The diode device may be an ideal diode.

This may advantageously reduce power consumption.

The ideal diode device may comprise a MOSFET and a controller for controlling the MOSFET.

The controller may comprise a control chip or a control circuit comprising one or more transistors.

The controller may be configured to drive the MOSFET ON when a voltage at an input of the ideal diode device is higher than a voltage at an output of the ideal diode device, the MOSFET being OFF otherwise.

In this way, the ideal diode device acts to block a reverse current to the power source, thereby reducing back-flow of an ASK signal from the wireless charging transmitter to the power source.

The diode device may be a normal diode, for example a Schottky diode.

The wireless charging transmitter may further comprise a capacitor coupled in parallel with the inverter.

This may be useful for providing hold-up time or improving voltage stability when the diode device is non-conducting. One end of the capacitor may be coupled to the diode device and the first or second inverter input terminal. The other end of the capacitor may be coupled to ground.

The diode device may be coupled between the first input terminal and the first inverter input terminal. Alternatively, the diode device may be coupled between the second inverter input terminal and the second input terminal. That is, the diode device may be provided at either the high side or the low side.

The wireless charging transmitter may be a single stage power transmitter.

The inverter may be a full bridge inverter.

The power source may be a battery.

The wireless charging power transmitter may be configured to receive and demodulate data signals received as a modulation of the coil current or voltage.

The control system may be implemented by a microcontroller unit (MCU).

According to another aspect of the disclosure, there is provided a system comprising:
a first wireless charging transmitter as defined above, and
a further device,
wherein the first wireless charging transmitter and the further device are arranged to receive power from the same power source.

The further device may be a second wireless charging transmitter as defined above.

The first wireless charging transmitter may further comprise a diode device coupled between one of the first and second input terminals and a corresponding one of the first and second inverter input terminals.

The diode device of the first wireless charging transmitter may prevent an ASK signal received at the coil of the first wireless charging transmitter from back-propagating to the DC voltage bus of the common power source to interfere with an ASK signal received at the second wireless charging transmitter.

According to another aspect of the disclosure, there is provided a method for controlling a wireless charging transmitter, the wireless charging transmitter comprising first and second input terminals for receiving an input voltage from a power source, a coil, an inverter coupled to the input terminals and configured to provide an output voltage to the coil, the method comprising:
monitoring the input voltage, and
controlling the inverter to adjust the output voltage, based on an offset between the monitored voltage and a target voltage, to at least partially compensate the offset.

The method may further comprise:
monitoring a current in the coil, and
controlling the inverter to adjust the output voltage, to reduce an offset between the monitored current and a target current.

According to another aspect of the disclosure, there is provided a wireless charging transmitter comprising:
first and second input terminals for receiving an input voltage from a power source;
a coil;
an inverter having first and second inverter input terminals coupled to the first and second input terminals respectively, and first and second inverter output terminals for providing an output voltage to the coil; and
a diode device coupled between one of the first and second input terminals and a corresponding one of the first and second inverter input terminals.

BRIEF DESCRIPTION OF THE DRAWINGS

Example embodiments of the present disclosure will be described, by way of example only, with reference to the accompanying drawings in which like reference signs relate to like elements and in which.

DETAILED DESCRIPTION

Figure 1:
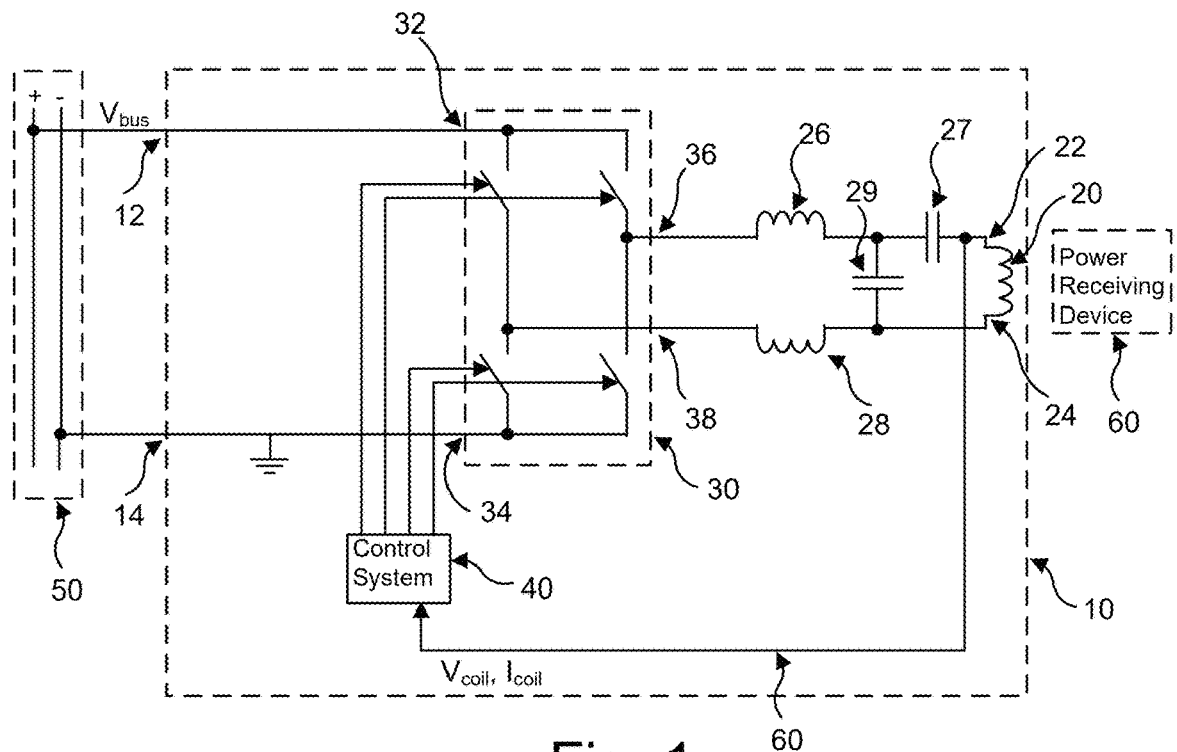
FIG. 1 schematically illustrates a single power stage wireless charging transmitter.

FIG. 1 shows an example single power stage wireless charging transmitter 10 connected to a DC power source 50, in the form of a battery, and arranged for wirelessly transmitting power to a power receiving device 60. The wireless charging transmitter 10 comprises first and second input terminals 12, 14 for receiving an input voltage from the power source 50, a coil 20, an inverter 30, and a control system 40. In FIG. 1, the first and second input terminals 12, 14 are coupled to the positive and negative terminals of the battery 50 respectively. The inverter 30, in the form of a full bridge inverter, comprises first and second inverter input terminals 32, 34, coupled to the first and second input terminals 12, 14 respectively, and first and second inverter output terminals 36, 38, for providing an output voltage to the coil 20. The first inverter output terminal 36 is coupled to a first terminal 22 of the coil 20 via a first inductor 26 and a capacitor 27 connected in series between the first inverter output terminal 36 and the first coil terminal 22. The second inverter output terminal 38 is coupled to a second terminal 24 of the coil 20 via a second inductor 28. A second capacitor 29 is connected in parallel with the coil 20 and the first capacitor 27, with one terminal of the second capacitor 29 connected between the first inductor 26 and the first capacitor 27, and the other terminal of the second capacitor 29 connected between the second inductor 28 and the second terminal 24 of the coil 20. The control system 40 is configured to control the inverter 30, for example by controlling the duty cycle, phase and/or frequency of the inverter 30, to provide the desired output voltage waveform to the coil 20. The control system 40 also receives a signal 60 for sampling the current Icoil and/or voltage Vcoil of the coil 20.

Other devices may also be connected to the battery 50, and the various power requirements and operating frequencies of these devices may lead to instantaneous changes in power consumption which can perturb the DC source voltage. The battery voltage may therefore be influenced by the working status of the various devices connected to the battery, such that an AC ripple may be generated on the battery voltage and thereby coupled to the power transmitter coil current/voltage of the wireless charging transmitter.

An AC noise ripple on the DC power source voltage of a wireless charging transmitter, generated by other devices sharing the same DC power source, can be coupled onto the coil current/voltage causing interference with the in-band communication. This can result in an ASK communication error, potentially causing failure of the wireless charging. Although the DC-DC stage in dual-stage transmitters can help to reduce the ripple, many applications use single-stage transmitters which control power delivery using just frequency control or duty cycle control.

As an example, when a DC/DC converter connected to the same battery as a wireless charging transmitter is operating, there may be some frequency DC/DC operation ripple coupled on the DC voltage bus. This may impact on the coil current/voltage of the wireless charging transmitter, causing the ASK demodulation to fail.

As another example, when two or more wireless charging transmitters share the same DC power source, the ASK signal at one transmitter may back-flow to the DC voltage bus and interfere with the ASK signal at the other transmitter. For example, when a first wireless charging transmitter is operating, its ASK communication signal may be coupled onto the DC voltage bus, thereby impacting the coil current/voltage of the second wireless charging transmitter, causing the ASK demodulation to fail at the second wireless charging transmitter. The first wireless charging transmitter may be affected by the second wireless charging transmitter in the same way.

Figure 2:
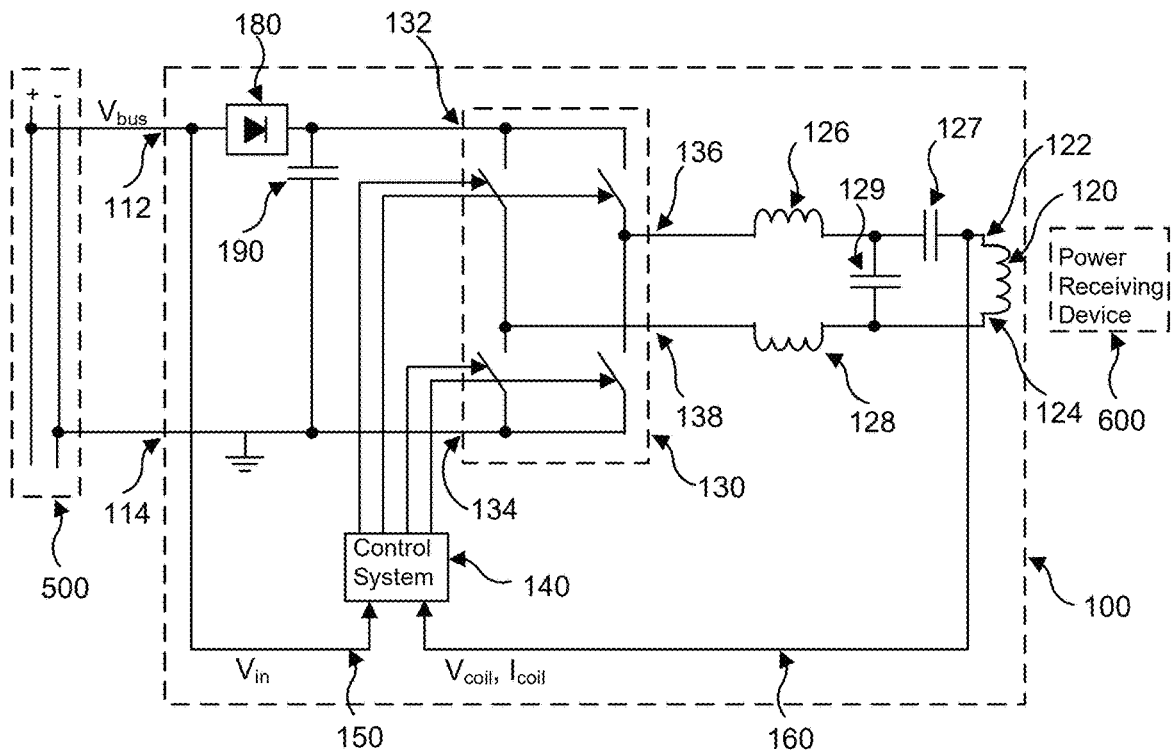
FIG. 2 schematically illustrates a wireless charging transmitter according to an example embodiment of the present disclosure.

FIG. 2 shows a wireless charging transmitter 100 according to an example embodiment of the present disclosure. The wireless charging transmitter 100, in the form of a single power stage wireless charging transmitter, is coupled to a DC power source 500, in the form of a battery, and arranged for wirelessly transmitting power to a power receiving device 600. The wireless charging transmitter 100 comprises first and second input terminals 112, 114, a coil 120, an inverter 130, and a control system 140. In FIG. 2, the first and second input terminals 112, 114 are coupled to the positive and negative voltage bus respectively of the battery 500 for receiving power from the battery. The inverter 130, in the form of a full bridge inverter, comprises first and second inverter input terminals 132, 134, coupled to the first and second input terminals 112, 114 respectively, and first and second inverter output terminals 136, 138, for providing an output voltage to the coil 120. The inverter 130 comprises transistors, schematically indicated as switches in FIG. 2, controlled by pulse width modulation. The first inverter output terminal 136 is coupled to a first terminal 122 of the coil 120 via a first inductor 126 and a capacitor 127 connected in series between the first inverter output terminal 136 and the first coil terminal 122. The second inverter output terminal 138 is coupled to a second terminal 124 of the coil 120 via a second inductor 128. A second capacitor 129 is connected in parallel with the coil 120 and the first capacitor 127, with one terminal of the second capacitor 129 connected between the first inductor 126 and the first capacitor 127, and the other terminal of the second capacitor 129 connected between the second inductor 128 and the second terminal 124 of the coil 120.

The control system 140 is configured to control the inverter 130, for example by controlling the duty cycle, phase and/or frequency of the inverter 130 by controlling the switching times of the transistors of the inverter 130, to provide the desired output voltage waveform to the coil 120. The control system 140 also receives a signal 150 for sampling the voltage Vin received by the wireless charging transmitter 100 from the power source 500, and a signal 160 for sampling the current Icoil in the coil 120. The signal 160 is used for control of the power transmitted from the wireless charging device 100 to the power receiving device 600. The signal 150 and optionally the signal 160, is used by the control system 140 for compensating a ripple or noise on the voltage Vin, as will be described in more detail in connection with FIGS. 6 to 8. The control system 140 may be implemented by a digital power control MCU (microcontroller unit).

The wireless charging transmitter 100 further comprises a diode device 180 and a hold-up capacitor 190. The diode device 180 is coupled in series between one of the first and second input terminals 112, 114 and a corresponding one of the first and second inverter input terminals 132, 134. In the example shown in FIG. 2, the diode device 180 is coupled between the first input terminal 112 (in use, coupled to the positive terminal of the DC power source 500) and the first inverter input terminal 132. However, the diode device 180 is not limited to be provided on the high side and may alternatively be provide on the low side, as will be described below in connection with FIG. 3.

The diode device 180 acts to prevent back-flow of the wireless charging ASK signal to the voltage bus of the DC power source 500. The diode device 180 is arranged to preferentially allow current to flow from the first input terminal 112 to the first inverter input terminal 132, while blocking current from flowing in the reverse direction. When the voltage at the inverter input terminal 132 is higher than the voltage Vin at the input terminal 112, the diode device 180 is non-conducting, thereby blocking a reverse current and preventing an ASK modulation at the coil 120 from being coupled to the DC power source. This in turn prevents the ASK signal from the wireless charging transmitter 100 from backflowing to the DC voltage bus and interfering with the ASK demodulation effect at another wireless charging transmitter sharing the same power source 500.

Figure 3:
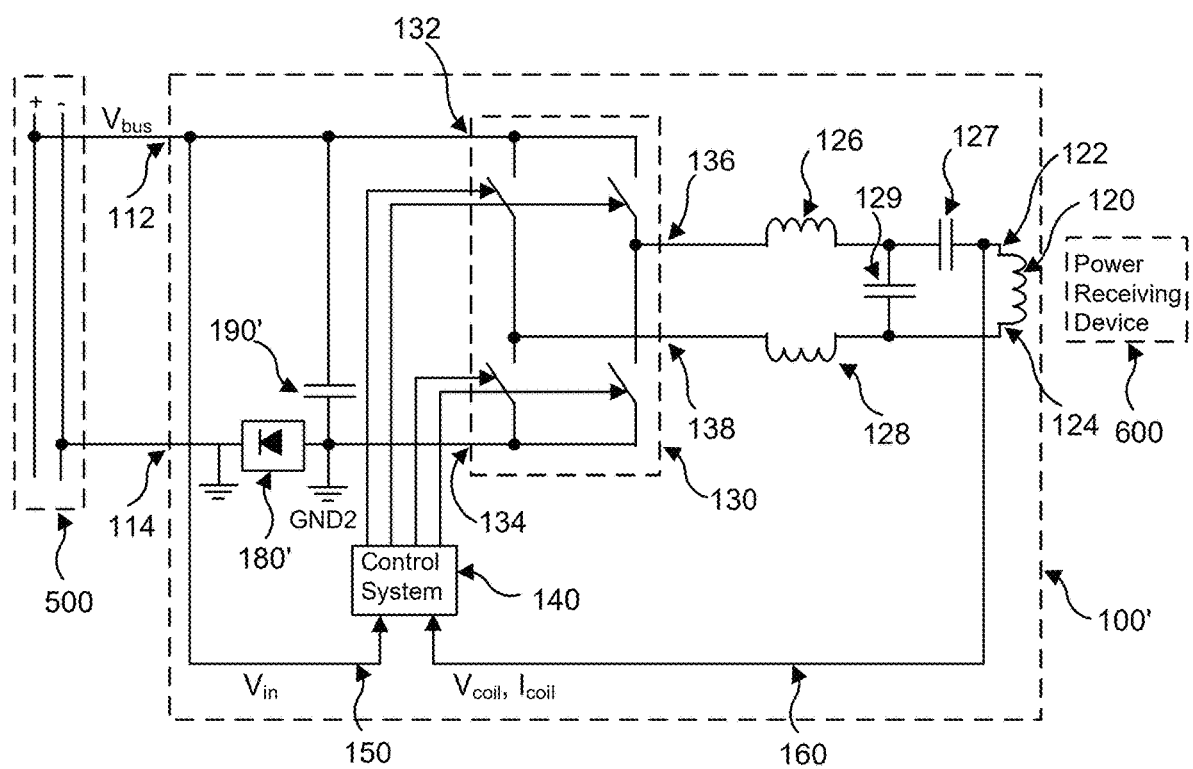
FIG. 3 schematically illustrates a wireless charging transmitter according to another example embodiment of the present disclosure.

FIG. 3 shows a wireless charging transmitter 100' according to another example embodiment of the present disclosure. The wireless charging transmitter 100' of FIG. 3 differs from the wireless charging transmitter 100 of FIG. 2 in that the diode device 180' is provided on the low side rather than the high side. That is, in the example embodiment shown in FIG. 3, the diode device 180' is coupled between the second input terminal 114 (in use, coupled to the negative terminal of the DC power source 500) and the second inverter input terminal 134.

Figure 4:
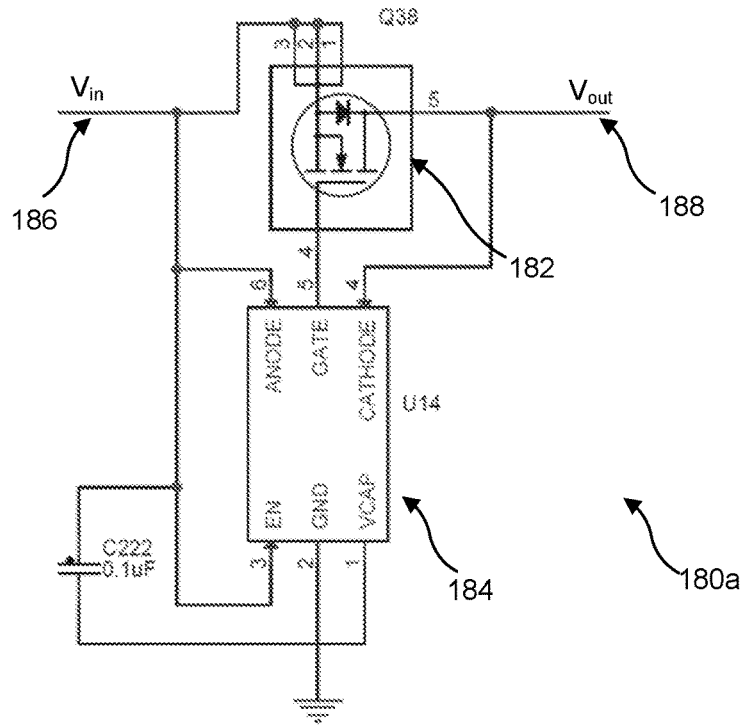
FIG. 4 shows an example configuration of an ideal diode for use in a wireless charging transmitter according to an example embodiment of the present disclosure.
Figure 5:
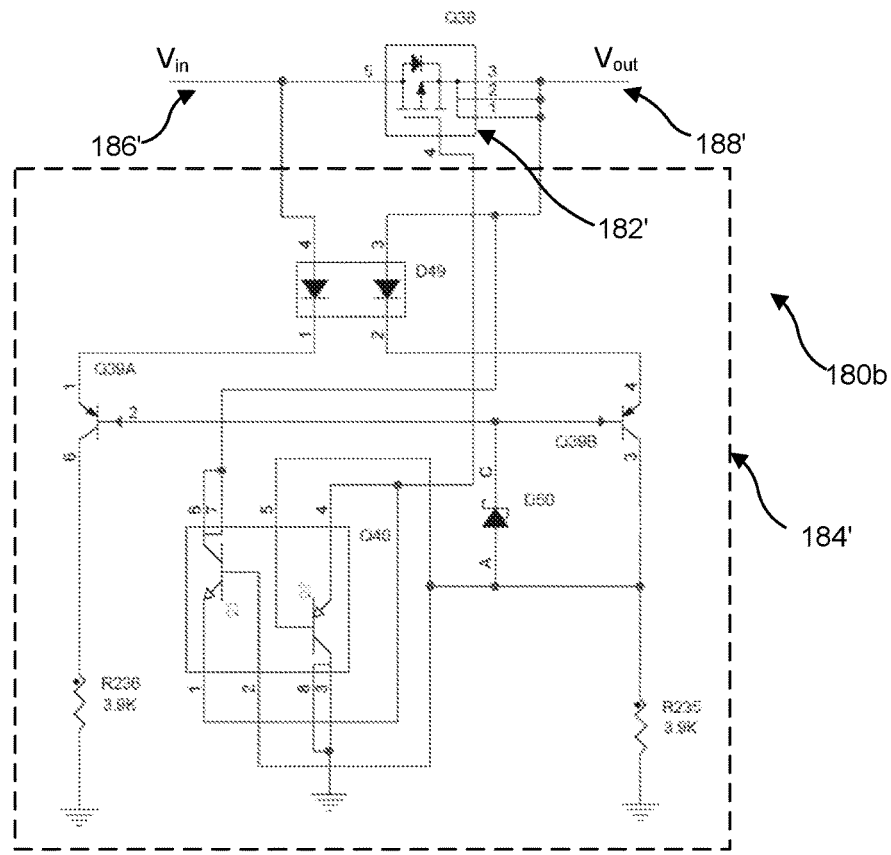
FIG. 5 shows another example configuration of an ideal diode for use in a wireless charging transmitter according to an example embodiment of the present disclosure.

The diode device 180, 180' is preferably in the form of an ideal diode. This provides the advantage of reducing power consumption. However, a normal diode, for example a Schottky diode, may alternatively be used. With reference to FIGS. 4 and 5, an ideal diode 180a, 180b may be implemented using a MOSFET 182, 182' integrated with a controller 184, 184'. The controller 184, 184' automatically detects the voltage Vin at the input 186, 186' of the ideal diode 180a, 180b (i.e. the voltage Vbus received from the power source 500 at the input terminal 112) and drives the MOSFET 182, 182' ON while the voltage Vin at the ideal diode input 186, 186' is higher than the voltage Vout at the ideal diode output 188, 188' (i.e. at the inverter input terminal 132). Otherwise the MOSFET 182, 182' will be OFF. Thus an ASK ripple on the coil 120 will be blocked from the voltage bus of the DC power source 500.

FIG. 4 shows an example configuration of an ideal diode 180a for use as the diode device 180 of the wireless charging transmitter 100. The ideal diode 180a comprises a MOSFET 182 and a controller 184 in the form of a control chip U14. This implementation can greatly reduce power consumption compared to a normal diode. The control chip U14 automatically detects the voltage Vin at the ideal diode input 186 (corresponding to the voltage Vbus at the input terminal 112 from the DC voltage bus) and drives the MOSFET 182 ON while the voltage Vin at the diode input 186 is higher than the voltage Vout at the ideal diode output 188 (i.e. the voltage provided to the inverter input terminal 132). The ideal diode 180a shown in FIG. 4 may also be used in the wireless charging transmitter 100' of FIG. 3.

FIG. 5 shows another example configuration of an ideal diode 180b for use as the diode device 180 of the wireless charging transmitter 100. The ideal diode 180b comprises a MOSFET Q38, 182' and a controller 184' in the form of a control circuit comprising transistors Q39A, Q39B, Q1 and Q2. This implementation can greatly reduce power consumption compared to a normal diode. If the voltage Vin at the ideal diode input 186' (i.e. the voltage Vbus at the input terminal 112 from the DC voltage bus of the power source 500) is higher than the voltage Vout at the ideal diode output 188' (i.e. the voltage provided to the inverter input terminal 132), transistor Q39A will be ON, transistor Q39B will be OFF, transistor Q2 in Q40 will be ON, transistor Q1 in Q40 will be OFF, Q40 OUT will be connected to GND, transistor Q38 will be ON, and the input 186' of the ideal diode 180b will be connected to the output 188' of the ideal diode 180b. That is, the input terminal 112 of the wireless charging transmitter 100 will be connected to the inverter input terminal 132, so that the voltage Vin is input to the inverter 130. If the voltage Vin at the ideal diode input 186' is lower than the voltage Vout at the ideal diode output 188', Q39A will be OFF, Q39B will be ON, Q1 in Q40 will be ON, Q2 in Q40 will be OFF, Q40 OUT will connect to the ideal diode output 188', Q38 will be OFF, and the output 188' of the ideal diode 180b will be disconnected from the input 186' of the ideal diode 180b. That is, the input terminal 112 of the wireless charging transmitter 100 will be disconnected from the inverter input terminal 132, to protect against reverse current. The ideal diode 180b shown in FIG. 5 may also be used in the wireless charging transmitter 100' of FIG. 3.

As shown in FIGS. 2 and 3, the hold-up capacitor 190, 190' is connected in parallel with the inverter 130. In the example shown in FIG. 2, one terminal of the hold-up capacitor 190 is connected between the diode device 180 and the inverter 130, the other terminal of the hold-up capacitor 190 being connected to the ground. In the example shown in FIG. 3, one terminal of the hold-up capacitor 190 is connected to a point between the diode device 180' and the inverter 130, the other terminal of the hold-up capacitor 190 being connected to the input terminal 112 of the wireless charging transmitter 100'. The capacitance of the holdup capacitor 190 is selected to provide sufficient holdup time while Vbus, the voltage on the bus of the DC power source 500, is lower than the voltage Vout input to the inverter 130. The required capacitance of the hold-up capacitor 190 depends on the frequency of any voltage ripple on the input voltage Vin received from the power source 500. For example, a 1 µF capacitance would be suitable for a 2 kHz ripple.

Figure 6:
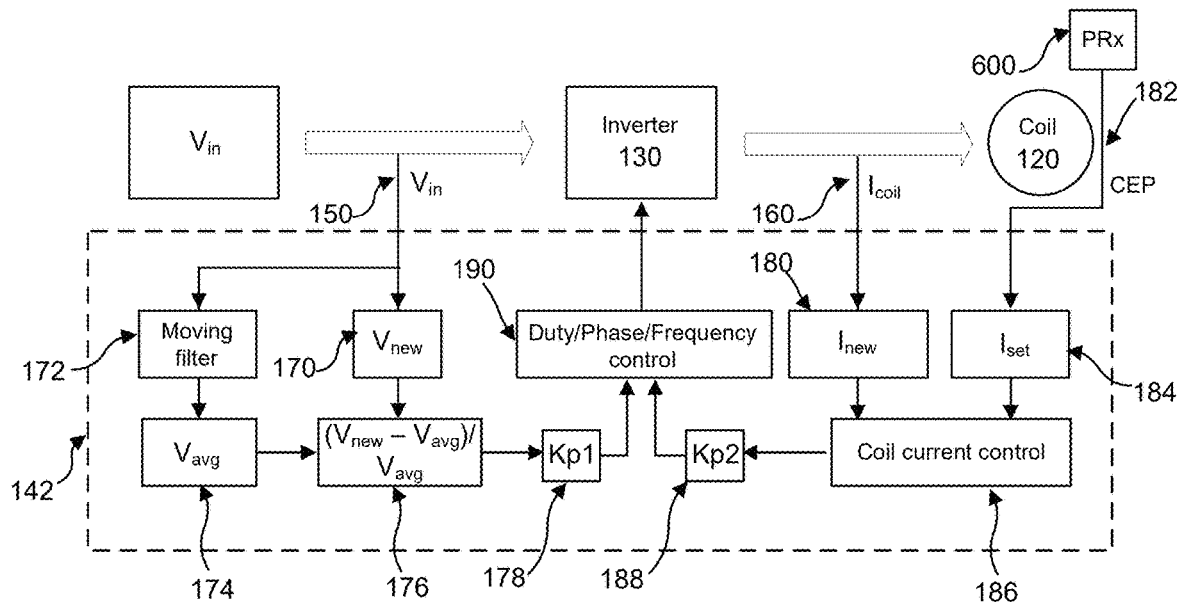
FIG. 6 schematically illustrates an example control loop implemented by the control system of the wireless charging transmitter according to an example embodiment of the present disclosure.

FIG. 6 schematically illustrates an example embodiment of a control loop 142 implemented by the control system 140 of the wireless charging transmitter 100, 100' according to an example embodiment of the present disclosure. FIG. 6 shows the following elements of the wireless charging transmitter system: the voltage Vin received by the wireless charging transmitter 100 from the power source 500, the inverter 130, the coil 120, the control loop 142 implemented by the control system 140, and the power receiving device 600 wirelessly receiving power from form the wireless charging transmitter 100.

The control system 140 is configured to monitor the voltage Vin received from the voltage source 500 at the input terminals 112, 114, and to control the inverter 130 to adjust the inverter output voltage based on an offset between the monitored voltage and a target voltage, to at least partially compensate the offset between the monitored voltage and the target voltage. For example, inverter 130 may be controlled to adjust the inverter output voltage in a sense opposite to the sense of the offset between the the monitored voltage and the target voltage. That is, if the monitored voltage increase, the inverter 130 may be controlled to decrease the inverter output voltage, and vice versa. In this example embodiment, the target voltage is an average value of the monitored voltage.

The control system 140 receives a signal 150 for sampling the voltage Vin received by the wireless charging transmitter 100 from the power source 500. The voltage Vin is sampled at a first sampling frequency 1/T1, to obtain the latest value Vnew 170 of Vin. A moving filter 172 or moving window is used to determine an average value Vavg 174 of the input voltage Vin over N1 cycles of the first sampling frequency. The moving filter 172 may be implemented by a software algorithm or by hardware such as external RC circuits. N1 is selected to provide a value Vavg sufficiently smooth to use as a reference. The values Vnew 170 and Vavg 174 are then compared to obtain an offset 176, in this example a relative offset (Vnew−Vavg)/Vavg. The offset is then used to determine a compensation parameter Kp1 174. For example the following formula may be used:

$$Kp1 = (Vnew - Vavg)/Vavg,$$

That is, the first compensation parameter Kp1 174 is a relative offset of the monitored voltage Vnew from the target voltage Vavg.

The control system 140 is also configured to monitor a current Icoil in the coil 120, and to control the inverter 130 to adjust the inverter output to reduce an offset between the latest value Inew 180 of the monitored current Icoil and a target current Iset 184. The target current Iset 184 is determined by a signal 182 received from the power receiving device 600, in the form of a control error packet (CEP) received by in-band ASK communication method. The signal 182 may include a power increase or power decrease command for adjusting the power wirelessly transmitted from the coil 120 to the power receiving device 600. The control system 140 also receives a signal 160 for monitoring the current Icoil in the coil 120. The coil current Icoil 160 is detected at a special timing window at a second sampling frequency 1/T2, to obtain the latest value Inew 180 of the coil current amplitude Icoil. Both Inew 180 and Iset 184 are sent to a coil current controller 186 comprising a PI controller (Proportional-Integral controller), which generates a compensation parameter Kp2 188. Since the coil current Icoil and coil voltage Vcoil have similar waveforms, the coil voltage may alternatively be monitored instead of the coil current.

The two parameters Kp1 178 and Kp2 188 are then input to a duty/phase/frequency controller 190 for outputting control signals to the inverter 130. The inverter 130 may be controlled by adjusting one or more control parameters of the inverter 130 such as the phase, duty cycle, frequency, etc. The relative change of the one or more control parameters may be proportional to the relative offset of the monitored voltage from the target voltage. Taking the duty cycle as an example, the control logic 190 may adjust the duty cycle according to the formula:

$$\text{Duty\_new} = (1 - Kp1)^* Kp2^* \text{Duty\_old},$$

where Duty_old and Duty_new are the duty cycle respectively before and after adjustment.

Corresponding expressions can be obtained for Alternatively, the control system 140 may control the inverter 130 by adjusting the phase shift or frequency of the inverter 130. For example, by increasing duty or phase or decreasing operation frequency of the inverter 130, the wireless charging transmitter 100 can provide increased power to the power receiving device 600 to compensate for a decrease in input voltage Vin.

The control loop 142 implemented by the control system 140 thereby causes the coil current Icoil to track the target coil current Iset. The coil current controller 186 generates an optimum value of Kp2 188 to cause the latest coil current Inew 180 to track the target value Iset 184.

Figure 7:
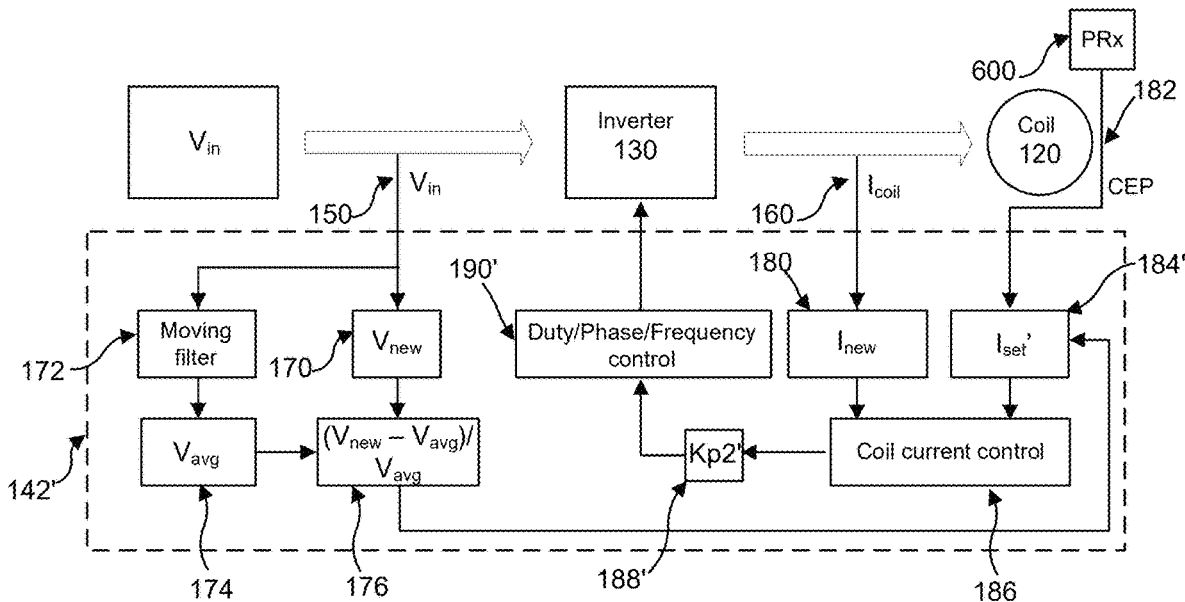
FIG. 7 schematically illustrates another example control loop implemented by the control system of the wireless charging transmitter according to an example embodiment of the present disclosure.

FIG. 7 schematically illustrates another example embodiment of a control loop 142' implemented by the control system 140 of the wireless charging transmitter 100 according to an example embodiment of the present disclosure. Whereas the control loop 142 shown in FIG. 6 corresponds to a 'direct' compensation loop, the control loop 142' shown in FIG. 7 corresponds to an 'indirect' compensation loop. FIG. 7 shows the following elements of the wireless charging transmitter system: the voltage Vin received by the wireless charging transmitter 100 from the power source 500, the inverter 130, the coil 120, the control loop 142 implemented by the control system 140, and the power receiving device 600 wirelessly receiving power from form the wireless charging transmitter 100.

The control system 140 is configured to monitor the voltage Vin received from the voltage source 500 at the input terminals 112, 114, and to control the inverter 130 to adjust the inverter output voltage based on an offset between the monitored voltage and a target voltage, to at least partially compensate the offset between the monitored voltage and the target voltage. In this example embodiment, the target voltage is an average value of the monitored voltage.

The control system 140 receives a signal 150 for sampling the voltage Vin received by the wireless charging transmitter 100 from the power source 500. The voltage Vin is sampled at a first sampling frequency 1/T1, to obtain the latest value Vnew 170 of Vin. A moving filter 172 or moving window is used to determine an average value Vavg 174 of the input voltage Vin over N1 cycles of the first sampling frequency 1/T1. The moving filter 172 may be implemented by a software algorithm or by hardware such as external RC circuits. N1 is selected to provide a value Vavg sufficiently smooth to use as a reference. The values Vnew 170 and Vavg 174 are then compared to obtain an offset 176, for example Vnew−Vavg.

The control system 140 is also configured to monitor a current Icoil in the coil 120, and to control the inverter 130 to adjust the inverter output to reduce an offset between the latest value Inew 180 of the monitored current Icoil and a target coil current Iset' 184'. The control loop 142' of FIG. 7 differs from the control loop 142 of FIG. 6 in that the offset 176, obtained by comparing the latest value of Vnew 170 of Vin and the target voltage Vavg 174, is used to adjust the target coil current Iset' 184'. The target coil current Iset' 184' is initially determined by a signal 182 received from the power receiving device 600, in the form of a control error packet (CEP) received by in-band ASK communication method. The signal 182 may include a power increase or power decrease command for adjusting the power wirelessly transmitted from the coil 120 to the power receiving device 600. This target coil current Iset' 184' is then adjusted based on the relative voltage offset 176, for example by adjusting the target coil current Iset' 184' by an amount proportional to the relative voltage offset 176. The control system 140 also receives a signal 160 for monitoring the current Icoil in the coil 120. The coil current Icoil 160 is detected at a special timing window at a second sampling frequency 1/T2, to obtain the latest value Inew 180 of the coil current amplitude Icoil. Both Inew 180 and Iset' 184' are sent to a coil current controller 186 comprising a PI controller (Proportional-Integral controller), which generates a compensation parameter Kp2' 188'. Since the coil current Icoil and coil voltage Vcoil have similar waveforms, the coil voltage may alternatively be monitored instead of the coil current.

The compensation parameter Kp2' 188' is then input to a duty/phase/frequency controller 190' for outputting control signals to the inverter 130. The inverter 130 may be controlled by adjusting one or more control parameters of the inverter 130 such as the phase, duty cycle, frequency, etc. The relative change of the one or more control parameters may be proportional to the relative offset of the monitored voltage from the target voltage. Taking the duty cycle as an example, the controller 190' may adjust the duty cycle according to the formula:

Duty_new=$Kp2$*Duty_old, where Duty_old and Duty_new are the duty cycle respectively before and after adjustment. Alternatively, the control system 140 may control the inverter 130 by adjusting the phase shift or frequency of the inverter 130. For example, by increasing duty or phase or decreasing operation frequency of the inverter 130, the wireless charging transmitter 100 can provide increased power to the power receiving device 600 to compensate for a decrease in input voltage Vin.

The control loop 142' shown in FIG. 7 thereby causes the coil current Icoil to track the target coil current Iset' 184'. The coil current controller 186 generates an optimum value of Kp2' 188' to cause the latest coil current Inew 180 to track the target value Iset' 184'.

The sampling periods T1 and T2 may have fixed values, for example 20 μs and 500 μs respectively. However, the control system 140, 140' may be configured to automatically detect a frequency of a ripple on the input voltage Vin and to select T1 and T2 accordingly. For example, the control system 140, 140' may include an MCU, and a hardware comparator and zero crossing points may be provided for the MCU to detect the ripple frequency. The values of T1, T2 and/or N1 may then be selected based on the ripple frequency. Typically, the compensation frequency 1/T1 should be at least 10 times the input AC ripple frequency. For example, for an input ripple frequency of 2 kHz, the compensation frequency 1/T1 may be 20 kHz or higher. N1 would then need to be at least 10 if the compensation frequency 1/T1 is 20 kHz in order to cover a full period of the ripple so as to obtain a smooth value for the average value. The control frequency 1/T2 for the coil current may be set at 1 kHz initially. If using the direct compensation loop shown in FIG. 6, T2 may remain a constant value. However, when using the indirect compensation loop shown in FIG. 7, one strategy is to increase the control frequency 1/T2 to 10 times the AC ripple frequency.

The control system 140, 140' therefore operates to reduce the influence on the coil current/voltage of an AC ripple on the voltage Vin received from the power source 500, thereby improving stability of the system. Without the control system 140, 140', a ripple on the input voltage Vin would cause the coil current/voltage to fluctuate. By adjusting one or more other parameters (duty cycle, phase, frequency) of the inverter 130, it is possible to compensate the ripple on the input voltage Vin to keep the coil current/voltage stable. The control loop implemented by the control system 140, 140' therefore has the effect of compensating any fluctuations or ripple in the input voltage so that the effect of this ripple on the coil current/voltage is reduced. In turn this reduces the likelihood of ASK demodulation resulting in errors or failure due to a ripple on the input voltage, thereby improving the stability of the charging by the wireless charging transmitter.

The control loop 142, 142' implemented by the control system 140 may not be operational for all times. For example, in some embodiments, the control loop 142, 142' may only operate when the ripple amplitude is above a predetermined threshold.

Figure 8:
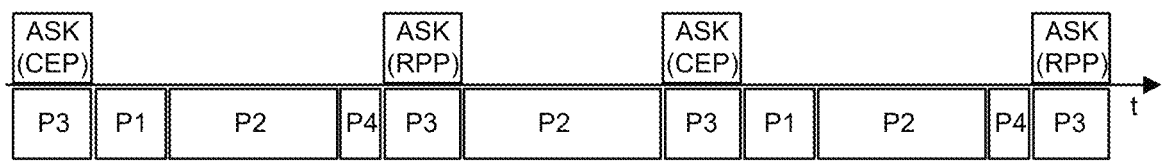
FIG. 8 illustrates a control timing sequence for a wireless charging transmitter according to an example embodiment of the present disclosure.

FIG. 8 illustrates an example control timing sequence for the wireless charging transmitter 100. There are two types of key communication packets in wireless charging systems: the control error packet (CEP) for power control and received power packet (RPP) for foreign object detection (FOD). The time periods labelled ASK (CEP) and ASK (RPP) indicate times during which these respective packets are received by the wireless charging transmitter 100 from a power receiving device 600 by ASK method. After the CEP has been received, the control system 140 enters Phase 1 (P1) during which a conventional wireless charging power control process is implemented. The control loop 140, 140' will run during this time. Phase 1 (P1) is followed by Phase 2 (P2), which is a period of silent time during which no ASK communication signal is transmitted by the power receiving device 600 The control system 140 then enters phase 4 (P4) during which the control loop is paused to ensure that accurate power sample data is obtained for foreign object detection (FOD). Phase 4 (P4) is followed by Phase 3 (P3), which is a period of time during which the power receiving device 600 transmits a received power packet (RPP) by ASK communication method. When an ASK signal is being received, the coil current/voltage is influenced not only by any AC ripple coupled to the input voltage but also by the modulation signal generated by the power receiving device 500. Therefore, in the "direct compensation" loop shown in FIG. 6, only the Vin compensation loop is operational during this time. It is assumed that the loading, position, and other conditions of the charging system will remain constant during the Phase 3 (P3) period, and that an optimum value of Kp2 was obtained during the Phase 1 (P1) period, such that the most recently generated Kp2 value can be used throughout the Phase 3 (P3) period. Once the next RPP has been received, control system 140 enters Phase 2 (P2) again. When the power receiving device 600 transmits the next control error packet (CEP), the control system 140 enters Phase 3 (P3). For the direct compensation mode shown in FIG. 6, the voltage compensation loop generating the compensation parameter Kp1 operates during Phases 1 (P1), 2 (P2) and 3 (P3), while the coil current control loop (generating compensation parameter Kp2) operates only during Phase 1 (P1). For the indirect compensation mode shown in FIG. 7, the coil current control loop (generating the compensation parameter Kp2' and including the adjustment of the target coil current 184' based on the voltage offset 176), operates during Phases 1 (P1), 2 (P2) and 3 (P3). In this way, the control system provides good dynamic performance in response to changing conditions.

Typically, the data packets/CEP are received at intervals of 200 ms. The ASK packet itself costs about 20 ms. Therefore Phase 3 (P3) typically lasts around 30 ms. In the part of the timing sequence immediately preceding ASK (RPP), Phase 1 (P1) typically lasts around 10 ms, Phase 2 (P2) typically lasts around 155 ms, and Phase 4 (P4) typically lasts around 5 ms. In the part of the timing sequence immediately preceding ASK(CEP), Phase 2 (P2) typically lasts around 170 ms.

Figure 9:
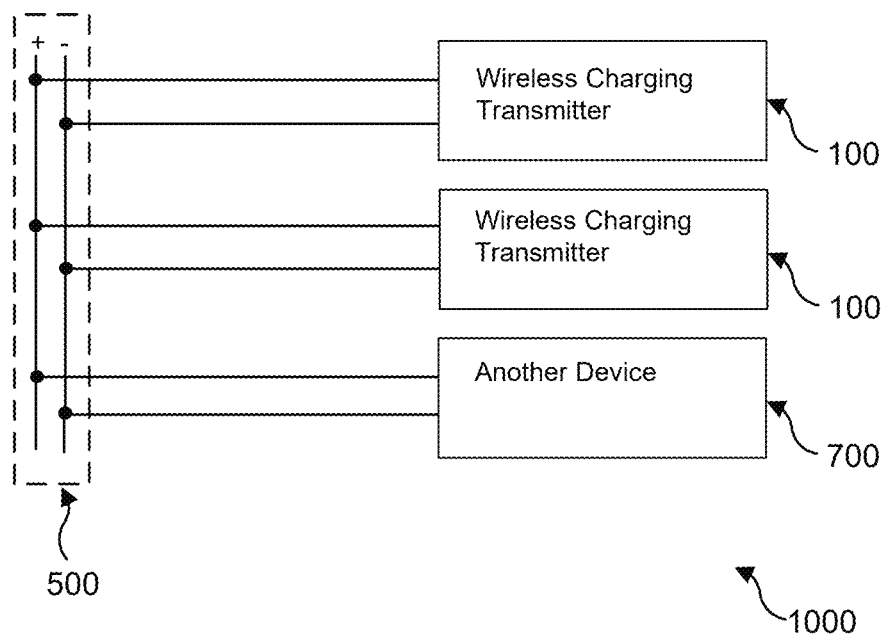
FIG. 9 illustrates a system comprising a wireless charging transmitter according to an example embodiment of the present disclosure.

FIG. 9 illustrates a system 1000 comprising a wireless charging transmitter 100 according to an example embodiment of the present disclosure. The system 1000 comprises a first wireless charging transmitter 100, a second wireless charging transmitter 100, and another device 700, for example a switched-mode power supply or a device comprising a DC/DC converter, each connected to the voltage bus of a DC power source 500 in the form of a battery.

The battery voltage may be influenced by the working status (power consumption, operating frequency and so on) of the various devices connected to the battery 500, such that an AC ripple or other instantaneous perturbations may be generated on the battery voltage and thereby coupled to the coil current/voltage of the first wireless charging transmitter 100. However, the control system 140, 140' of the wireless charging transmitter 100 described above compensates fluctuations or ripples in the input voltage, to reduce or eliminate coupling of the perturbations onto the coil current. In addition, the diode device 180, 180' of the first wireless charging transmitter 100 reduces or eliminates coupling of an ASK signal from the first wireless charging transmitter 100 to the DC voltage bus and thus to the coil current/voltage of the second wireless charging transmitter 100 and vice versa. In this way, the likelihood of an ASK communication error at the wireless charging transmitter 100 is reduced.

The diode device of the example described above may also be used in other embodiments independently of the control loop implemented by the control system.

Although particular example embodiments of the disclosure have been described above, it will be appreciated than many modifications, including additions and/or substitutions, may be made within the scope of the appended claims.

The invention claimed is:

1. A wireless charging transmitter, comprising:
first and second input terminals for receiving an input voltage from a power source;
a coil;
an inverter having first and second inverter input terminals coupled to the first and second input terminals respectively, and first and second inverter output terminals for providing an output voltage to the coil; and
a control system configured to:
monitor a voltage between the first and second input terminals, and
control the inverter to adjust the output voltage, based on an offset between the monitored voltage and a target voltage, to at least partially compensate the offset between the monitored voltage and the target voltage.

2. The wireless charging transmitter according to claim 1, wherein the control system is further configured to determine the target voltage, wherein the target voltage is an average value of the monitored voltage.

3. The wireless charging transmitter according to claim 1, wherein the control system is configured to control the inverter by adjusting one of a duty cycle, phase shift or frequency of the inverter by an amount that is determined by the offset between the monitored voltage and the target voltage.

4. The wireless charging transmitter according to claim 1, wherein the control system is configured to determine a frequency of a ripple on the monitored voltage, and to monitor the voltage between the first and second input terminals at a sampling frequency greater than the frequency of the ripple.

5. The wireless charging transmitter according to claim 1, wherein the control system is further configured to:
monitor a current in the coil, and
control the inverter to adjust the output voltage to reduce an offset between the monitored current and a target current.

6. The wireless charging transmitter according to claim 5, wherein the target current is adjusted based on the offset between the monitored voltage and the target voltage to at least partially compensate the offset between the monitored voltage and the target voltage.

7. The wireless charging transmitter according to claim 5, wherein the control system comprises a proportional-integral (PI) controller configured to output a signal for controlling the inverter based on the offset between the monitored current and the target current.

8. The wireless charging transmitter according to claim 1, wherein the wireless charging transmitter is configured to receive a power control signal from a device wirelessly receiving power from the wireless charging transmitter, wherein the control system is configured to control the inverter to adjust the inverter output voltage to at least partially compensate the offset between the monitored voltage and the target voltage and/or to reduce an offset between the monitored current and the target current after receiving each said power control signal.

9. The wireless charging transmitter according to claim 1, further comprising:
a diode device coupled between one of the first and second input terminals and a corresponding one of the first and second inverter input terminals.

10. The wireless charging transmitter according to claim 9, wherein the diode device is an ideal diode.

11. The wireless charging transmitter according to claim 10, wherein the ideal diode comprises a MOSFET and a controller for controlling the MOSFET.

12. The wireless charging transmitter according to claim 9, further comprising a capacitor coupled in parallel with the inverter.

13. The wireless charging transmitter according to claim 1, wherein the wireless charging transmitter is a single stage power transmitter.

14. A system comprising:
a first wireless charging transmitter according to claim 1,
a second wireless charging transmitter comprising:
third and fourth input terminals for receiving a second input voltage from the power source;
a second coil;
a second inverter having third and fourth inverter input terminals coupled to the third and fourth input terminals respectively, and third and fourth inverter output terminals for providing a second output voltage to the second coil; and a second control system configured to:
monitor a second voltage between the third and fourth input terminals, and
control the second inverter to adjust the second output voltage, based on a second offset between the monitored second voltage and a second target voltage, to at least partially compensate the second offset between the monitored second voltage and the second target voltage.

15. A method for controlling a wireless charging transmitter, the wireless charging transmitter comprising first and second input terminals for receiving an input voltage from a power source, a coil, an inverter coupled to the input terminals and configured to provide an output voltage to the coil, the method comprising:
monitoring the input voltage, and
controlling the inverter to adjust the output voltage, based on an offset between the monitored voltage and a target voltage, to at least partially compensate the offset.

16. A wireless charging transmitter comprising:
first and second input terminals for receiving an input voltage from a power source;
a coil;
an inverter having first and second inverter input terminals coupled to the first and second input terminals respectively, and first and second inverter output terminals for providing an output voltage to the coil; and
a diode device coupled between one of the first and second input terminals and a corresponding one of the first and second inverter input terminals.

17. The wireless charging transmitter of claim 16, wherein the diode device is an ideal diode.

18. The wireless charging transmitter according to claim 17, wherein the ideal diode comprises a MOSFET and a controller for controlling the MOSFET.

19. The system of claim 14, wherein the first wireless charging transmitter comprises a diode device coupled between one of the first and second input terminals and a corresponding one of the first and second inverter input terminals.

20. The method of claim 15, further comprising:
monitoring a current in the coil, and
controlling the inverter to adjust the output voltage, to reduce an offset between the monitored current and a target current.

* * * * *